(12) United States Patent  
Stephens et al.

(10) Patent No.: US 6,261,103 B1  
(45) Date of Patent: Jul. 17, 2001

(54) SYSTEM FOR ANALYZING AND/OR EFFECTING EXPERIMENTAL DATA FROM A REMOTE LOCATION

(75) Inventors: Philip J. Stephens, West Chester, PA (US); Christopher J. Dufort, Dover, NH (US); Clifford C. Bredenberg, Madbury, NH (US); Ashish More, Dover, NH (US); William P. Mitchell, Newmarket, NH (US)

(73) Assignee: CB Sciences, Inc., Dover, NH (US)

( * ) Notice: Subject to any disclaimer, the term of this patent is extended or adjusted under 35 U.S.C. 154(b) by 0 days.

(21) Appl. No.: 09/293,528

(22) Filed: Apr. 15, 1999

(51) Int. Cl.$^7$ .................................................. G09B 23/00
(52) U.S. Cl. .................. 434/276; 434/118; 434/350; 434/362; 434/365; 703/2; 703/11; 702/104
(58) Field of Search ..................................... 434/118, 156, 434/169, 185, 261, 276, 307 R–309, 322, 323, 327, 335, 350, 351, 362, 365, 367, 379; 345/145, 302, 473; 379/93.17; 700/79, 80, 91, 266; 702/104; 703/2, 11; 704/1, 211; 705/28; 706/927; 709/218; 324/113; 375/130, 222; 348/12; 514/2, 12; 530/350, 399

(56) References Cited

U.S. PATENT DOCUMENTS

| | | | |
|---|---|---|---|
| 4,793,813 | * 12/1988 | Bitzer et al. | 434/335 |
| 5,247,347 | 9/1993 | Litteral et al. | |
| 5,526,287 | * 6/1996 | French | 702/104 |
| 5,680,590 | * 10/1997 | Parti | 395/500 |
| 5,790,174 | 8/1998 | Richard, III et al. | |
| 5,813,865 | * 9/1998 | Greenbowe et al. | 434/276 |
| 5,861,881 | 1/1999 | Freeman et al. | |
| 5,861,883 | 1/1999 | Cuomo et al. | |
| 5,862,329 | 1/1999 | Aras et al. | |
| 5,867,494 | 2/1999 | Krishnaswamy et al. | |
| 5,867,495 | 2/1999 | Elliot et al. | |
| 5,867,653 | 2/1999 | Aras et al. | |
| 5,872,810 | * 2/1999 | Philips et al. | 375/222 |
| 5,875,396 | 2/1999 | Stockton et al. | |
| 6,018,768 | * 1/2000 | Ullman et al. | 709/218 |
| 6,097,995 | * 8/2000 | Tipton et al. | 700/266 |
| 6,112,049 | * 8/2000 | Sonnenfeld | 434/350 |

FOREIGN PATENT DOCUMENTS

| | | |
|---|---|---|
| 0 883 057 A2 | 12/1998 | (EP) . |
| 0 702 492 B1 | 1/1999 | (EP) . |
| WO 99/03124 | 1/1999 | (WO) . |

\* cited by examiner

*Primary Examiner*—Joe H. Cheng
(74) *Attorney, Agent, or Firm*—Foley, Hoag & Eliot, LLP

(57) ABSTRACT

An interactive computer system for teaching laboratory-based sciences. According to one embodiment, the system includes a data acquisition module, an internet-based coursework database, and internet-based interactive software tools. Using the interactive software tools, an instructor can select academic course materials and related laboratory experiments from the coursework database. The instructor can create an Internet web page, which provides students with an interactive visual interface with the selected course materials and laboratories, along with various analysis tools. The data acquisition module is located at the site of an experimentation laboratory, and interfaces with laboratory equipment to capture data from selected experiments. Experimental data is transmitted in real-time to an internet-based storage location.

31 Claims, 13 Drawing Sheets

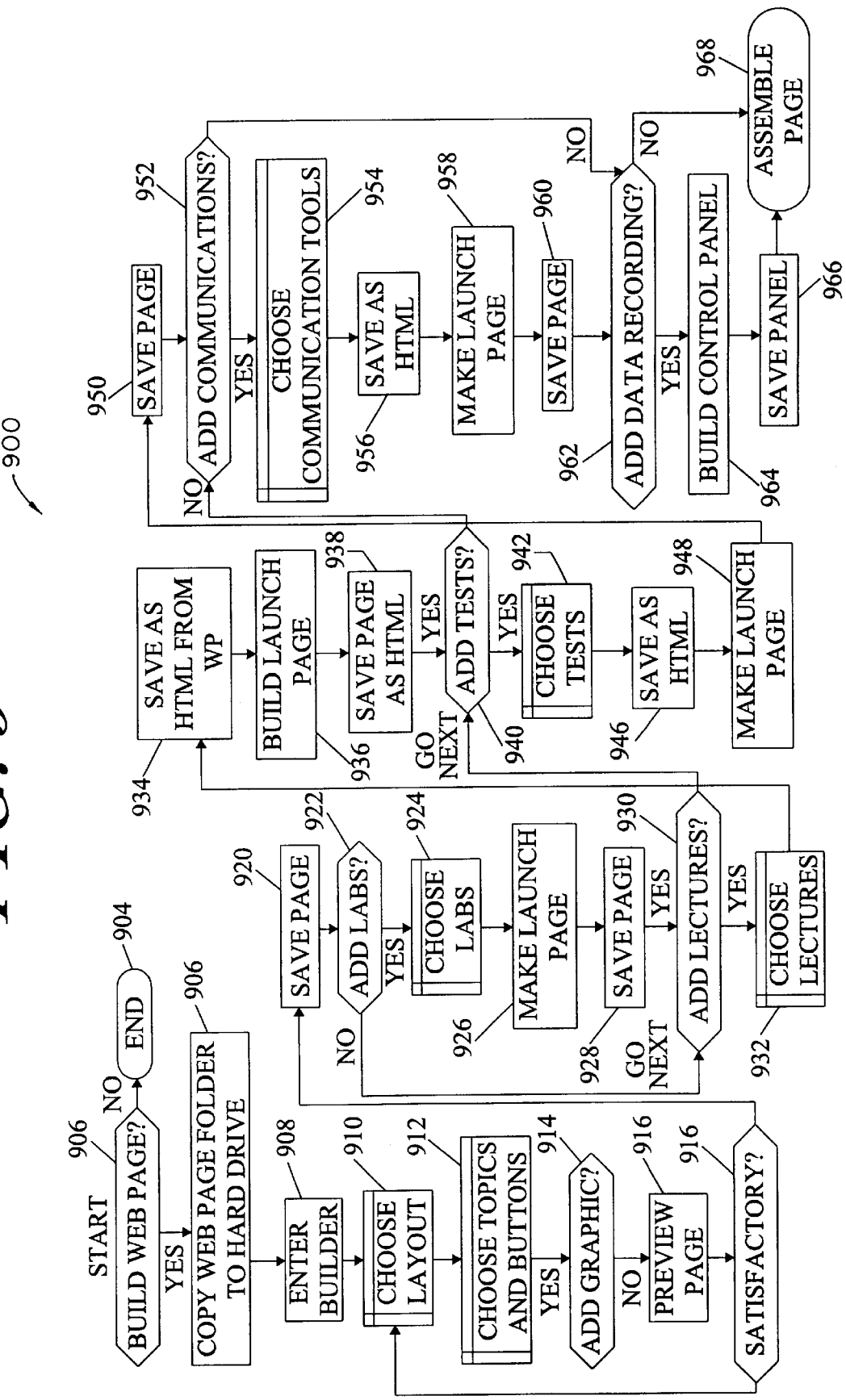

SYSTEM FOR ANALYZING AND/OR EFFECTING EXPERIMENTAL DATA FROM A REMOTE LOCATION

TECHNICAL FIELD

The present invention relates generally to computer apparatus and methods for laboratory experimentation. More particularly, the invention is directed to a computer system and related methods for enabling interested persons to perform laboratory experiments and to access information from locations remote from an experimentation laboratory.

BACKGROUND OF THE INVENTION

Distance learning refers to an educational system wherein students can access course materials from remote locations. Virtually all distance learning systems involve some type of classroom delivery technique. By way of example, prior art systems include such approaches as mail order courses, remotely broadcast lectures, video-taped courses, video conferencing and internet-based on-line courses. One deficiency of these prior approaches is that they require students to progress sequentially through the course material. In other words, students participating in a class from remote locations are not able to select the order in which course materials are presented. Another drawback of prior systems is that they require instructors to present materials in a predefined fixed format.

Additionally, some courses include a laboratory component as an important part of the curriculum. Traditionally, laboratory courses require students to perform experiments, acquire data from the experiments and analyze the acquired data. Prior art approaches address laboratory components in a variety of ways. By way of example, one prior art approach provides remotely located students with laboratory kits, so that they can perform requisite experiments at their respective remote sites. Although, laboratory kits provide a way of performing some relatively elementary experiments, they suffer from significant drawbacks. One such drawback is that kits can be expensive to fabricate and ship; especially where a multitude of students and experiments are involved. Another drawback is that advanced experiments may require expensive analysis equipment. Cost prohibits such equipment from being included in a kit, and some remotely located students may not have access to laboratories possessing the necessary equipment.

Another prior approach employs laboratory simulation software. Laboratory simulation software attempts to replicate experiments, and provides the type of data that a student might acquire from an actual experiment. An advantage of simulation software is that it is relatively inexpensive, as compared with laboratory kits. However, a drawback of simulation software is that the experience provided to a student is only as good or complete as the software employed. Additionally, no matter how complete the simulation, students nevertheless do not experience the full spectrum of nuances that typically occur in a genuine laboratory environment.

On occasion, scientists who are remotely located with respect to each other desire to take part in joint experiments. Those scientists experience challenges similar to those experienced by remotely located students. As in the case of students, prior systems fail to enable a plurality of remotely located scientists to collect, analyze and effect experimental data in real-time with respect to the conduct of the experiment. Typically, laboratory kits are not sophisticated enough to address these and like needs of scientists, and simulations do not provide actual data for the specific experiment of interest.

Accordingly, an object of this invention is to provide a computer system that enables persons, remotely located with respect to each other, to engage in joint laboratory experiments.

Another object of the present invention is to provide a computer system that enables persons, remotely located with respect to a laboratory, to engage in joint laboratory experiments.

A further object of the invention is to provide a computer system that enables students to learn in a self-directed manner with respect to other students participating in a particular course of study.

An additional object of the invention is to provide a computer system that enables instructors to draw from a library of course materials and tailor the presentation of those materials.

Another object of the invention is to provide a computer system that enables students, remotely located with respect to each other, to have a more realistic laboratory experience.

A further object of the invention is to provide a computer system that enables people to acquire data in real-time from experiments performed in a laboratory remotely located from them.

Other objects of the invention will be apparent in the following description of the invention.

SUMMARY OF THE INVENTION

The invention attains the foregoing objects by providing a computer system that enables people, remotely located with respect to a laboratory and/or each other, to collect and to analyze data developed in an experiment performed at that laboratory. According to one embodiment, the invention provides a system for teaching laboratory-based sciences. The system can include a data acquisition module, a data transmission module, an internet-based coursework database, internet-based analysis software tools, internet-based intervention software tools, and internet-based interactive software tools.

Using the interactive software tools, an instructor can design an academic course by selecting course materials and related laboratory experiments from the coursework database. The instructor creates an Internet web page, which provides students with an interactive, computer-based, visual interface with the selected course materials and laboratories, along with analysis and intervention tools. Through the web page, students can access course materials and related laboratories in a self-directed manner.

The data acquisition module, preferably located at the site of an experimentation laboratory, interfaces with laboratory equipment to capture data from a selected experiment. The data transmission module transmits the experimental data, in real-time, from the data acquisition module either to an internet-based storage location or to remotely located workstations. Students can analyze the experimental data, preferably by way of the web page, in real-time as the experiment is being performed. Alternatively, students can analyze the stored data at a later time. By using the analysis tools available at the Internet web site, students can formulate conclusions regarding the experimental data.

Students can also access the intervention tools through the Internet web page. In the case where students are analyzing data as an experiment is taking place, the intervention tools enable them to communicate with the laboratory, in real-time, to alter one or more experimental parameters. The transmission module transmits updated experimental data, via the Internet, back to the remotely located students; thereby enabling remotely located students to observe in real-time any effects the selected alterations have on the experimental data.

In a further, optional, embodiment, the computer system includes an internet-based simulation module. In the case where students analyze previously stored experimental data and are not in real-time communication with the laboratory, the simulation module processes the stored data along with the altered parameters and determines the likely effects of the alterations. The simulation module can modify the stored experimental data to reflect the projected effects, and students can view and analyze the modified data. According to a further feature, whether the intervention tools access a simulator module or transmits alterations in real-time to a laboratory is substantially transparent to the students.

According to another, optional, embodiment, the internet-based interactive tools include prompting tools for interrogating students regarding various features of the experimental data. By way of example, if a student is analyzing the data in real-time with respect to when the experiment is taking place and the analysis tools determine that the quality of the data might be questionable, the prompting tools can signal the student to cure the potential defects in the experiment. The prompting tools can also signal the student to perform various measurements with respect to the experimental data, such as determining heart rate from stored electrocardiogram (EKG) data.

In another, optional, embodiment, students can be located remotely with respect to each other. Such remotely located students may have access to laboratories having different equipment. This further practice of the invention enables different experiments to be performed at different laboratories. The data from each experiment can be transmitted in real-time or to the remotely located students. Alternatively, the data from each experiment can be transmitted to the internet-based storage location for later analysis and typically by any one or more of the remote students.

The above embodiments, specifically directed to laboratory-based courses of study, are also applicable to any persons, remotely located with respect to other persons or a laboratory, who desire to take part in joint experimentation, or joint observation and analysis of any type of collected data.

In further aspects, the invention includes methods corresponding to the above described computer system.

Thus, the invention provides computer systems, including information gathering and storage and transmission systems; and includes related methods for performing laboratory experiments, wherein those systems and related methods enable students and professionals to access stored information, such as course materials, in any designated sequence; and to engage in experiments at remote locations. The invention thus provides apparatus and methods for synchronous distance learning, including real-time experimentation. It thus overcomes significant deficiencies in the art.

BRIEF DESCRIPTION OF THE DRAWINGS

The subject matter regarded as the present invention is particularly pointed out and distinctly claimed in the concluding portion of the specification. The invention, however, both as to organization and methods of practice, together with further objects and advantages, may best be understood by reference to the following illustrative description taken in conjunction with the accompanying drawings in which like numerals refer to like elements, and in which

FIG. 9 is a flow chart illustrating operation of software for creating an Internet web page for enabling remotely located persons to participate jointly in laboratory experiments and academic courses of study;

DESCRIPTION OF ILLUSTRATED EMBODIMENTS

A computer system and related methods according to the invention enable people, remotely located with respect to a laboratory and/or each other, to engage in joint laboratory experiments. A further practice of the invention enables remotely located scientists to participate jointly in experiments. According to one embodiment, experimental data is transmitted, in real-time, from a laboratory where an experiment is being conducted to remotely located workstation by way of the Internet. Participants can access and analyze the data in real-time with respect to when the experiment is being conducted by way of the remote workstations. Alternatively, experimental data is transmitted to an Internet-based storage area for later analysis. Any participant accessing the data in real-time can intervene and signal people or equipment in the laboratory to alter selected experimental parameters. The system transmits updated data back to the remotely located participants for further analysis.

According to another embodiment of the invention, the system enables instructors to access a library of course materials, and to customize the presentation of those materials. Remotely located students can then access those course materials and perform related laboratory experiments. Unlike prior systems, which require either laboratory kits or simulations, one preferred embodiment of the invention enables remotely located students to acquire data, in real-time, as an experiment is being performed. Students also can acquire stored data from previously performed experiments. In a further practice, students can perform experiments from remote locations and transmit acquired data to other participants or the Internet storage area. Thus, if a particular student has access to laboratory equipment necessary for a particular experiment, that student can conduct the experiment and transmit the data to the Internet storage location or other participants. Other participating students can either view and analyze the transmitted data in real-time, or at a later time. If a student views the data in real-time, the system enables the student to intervene in the experiment and request alterations of particular experimental parameters.

Alternatively, if the student views the data at a later time, the student can access a simulation module. Unlike prior art simulators that simulate experimental results, a simulation module according to the invention processes prerecorded actual experimental data, along with alterations in selected experimental parameters, to provide a simulation of how the selected alterations might effect the experimental data. A simulation employing prerecorded experimental data, such as that embodied by the present invention, provides nuances not available in prior art systems, which employ simulated data.

Figure 1:
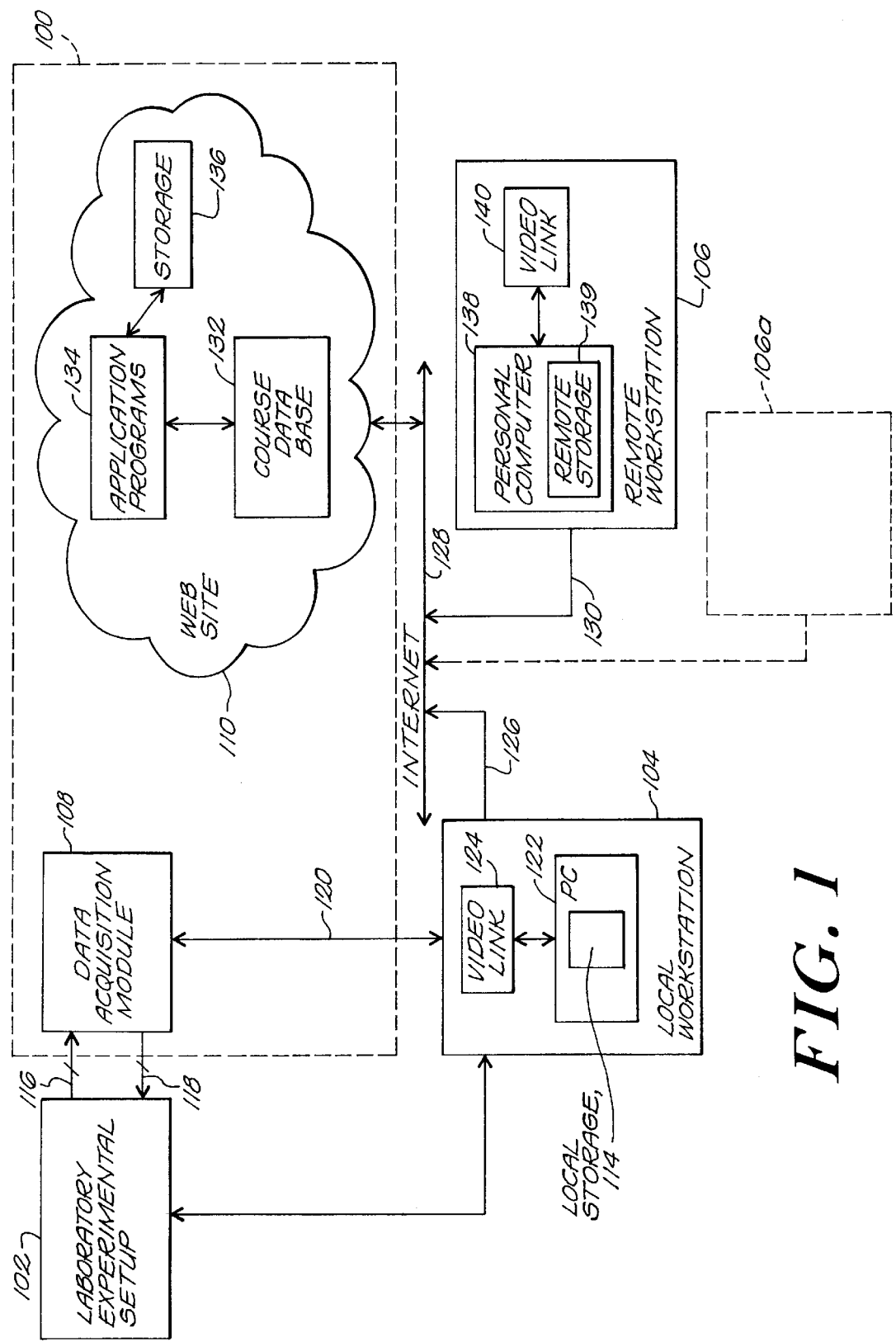
FIG. 1 is a schematic block diagram of a computer system embodying features of the invention.

FIG. 1 is a schematic block diagram illustrating operation of computer system 100 for analyzing and/or effecting experimental data. FIG. 1 includes the computer system 100, an experimental setup 102, a local workstation 104, and a remote workstation 106. According to the illustrated embodiment of the invention, the system 100 includes a data acquisition module 108 and an Internet web site 110. The data acquisition module 108 is controlled by data acquisition software 114 resident on the local workstation 104. Preferably, the data acquisition module 108 is located at the laboratory site where an experiment of interest is being conducted. Typically, the experimental setup 102 provides various analog and/or digital sensor output signals 1 16 to the data acquisition module 108. Additionally, the data acquisition module 108 provides a plurality of analog and/or digital control signals 118 to the experimental setup 102.

The experimental setup 102 can include virtually any configuration of equipment required for performing an experiment. By way of example, the setup 102 can include a transducer amplifier and a blood pressure transducer for performing measurements of cardiovascular function. As such, the output signals 116 can include systolic and diastolic blood pressure waveforms. Additionally, the control signals 118 can include stimulation to the vagus nerve to affect heart rate.

The local workstation 104 provides a human communication interface to the data acquisition module 108 by way of control and communication signals 120. As shown in the illustrated embodiment, the workstation 104 can include a personal computer 122 and a video interface 124. The workstation 104 couples via telecommunication interface 126 to the Internet 128. Persons remotely located from each other and/or the experimental setup 102 can communicate with persons located at the site of the experimental setup 102 by way of remotely located workstations 106. The workstations 106 couple to the Internet 128 via telecommunication interface 130.

The Internet site 110 includes a coursework library 132, application programs 134 and experimental data storage space 136. The coursework library 132 contains academic course materials and related experiments for a plurality of laboratory-based topics. The storage space 136 can store experimental data received from data acquisition module 108. The application programs 134 include programs for enabling instructors to select particular materials and related laboratory experiments to be included in an academic course of study. The application programs 134 also include programs for enabling students to access the course material in a self-directed manner; participate in experiments conducted at remotely located laboratories; analyze experimental data in real-time with respect to when an experiment is performed; and perform simulations on experimental data previously stored in storage space 136. The application programs 134 also include programs for enabling an instructor to design an Internet web page, through which students can access the selected course materials and related laboratories, along with the application programs 134. As those skilled in the art will appreciate, references to Internet sites are logical references rather than physical references. Likewise, references to Internet storage locations are also references to logical locations rather than physical locations. Physical storage of information resides on an Internet server computer.

In operation, an instructor selects course materials and related experiments from the database 132. The instructor also designs an Internet web page enabling students to access the selected course materials and the above discussed application programs. People, located at the site of the laboratory, can perform the selected experiments using experimental setups such as setup 102. Data acquisition module 108, located at the laboratory site, captures experimental data transferred from setup 102 by way of sensor output signals 116. The data acquisition module 108 transmits the captured data to the local workstation 104. The local workstation 104 transmits the captured data, along with a video feed of the experiment, in real-time to remote participants by way of telecommunications interface 126 and the Internet 128. Additionally, the local workstation 104 also transmits the captured data and the video feed to storage space 136. Students, located remotely with respect to the experimental setup 102, can access the stored experimental data in real-time by way of remote workstations 106. According to the illustrated embodiment, the remotely located students employ the instructor-designed web page and the application programs 134 to access and analyze the stored experimental data.

In the case where the students access the data in real-time, they can signal a request to the data acquisition module 108 to alter selected experimental parameters. The students transmit such requests by way of remote workstations 106 and Internet connection 130. The local workstations 104 receive the requests and forward them to the data acquisition module 108. The data acquisition module effectuates the alterations by way of control signals 118. According to one embodiment, the process by which alteration requests are implemented is automated. According to other embodiments, a person at local workstation 104 reviews the requests prior to forwarding them to the data acquisition module for implementation. According to a further embodiment, some alteration requests are implemented by the persons performing the experiment. Additionally, the nature of the requests can vary. By way of example, the requests can be directed to changing selected experimental variables. Alternatively, the requests can be directed to verifying that the experimental setup is not defective.

According to a further embodiment, the application programs 134 include an interactive program, which prompts the remotely located students to request particular alterations in experimental parameters. By way of example, in response to signals indicating anomalous data from the analysis program, the interactive program prompts remotely located students to request verification of the appropriateness of the experimental setup 102. According to a further feature, the interactive program prompts remotely located students to request particular alterations in experimental variables.

Regardless of the source or implementation of the alteration in an experimental parameter, the data acquisition module 108, captures and transmits updated data back to the remote participants for further analysis.

In the case where remotely located students analyze previously stored experimental data, the students can download the experimental data and access the simulation application programs to determine how varying particular experimental parameters potentially effects the captured data. Once again, the interactive program can prompt the students to vary particular experimental parameters, via the simulation programs.

While the illustrated embodiment of FIG. 1 depicts a single laboratory setup 102, the system 100 can accommodate multiple laboratory setups. By way of example, different laboratories posses different experimental capabilities. Consequently, it is sometimes practical to perform the various experiments, included in the academic course of study, at different laboratories. Accordingly, data acquisition modules 108 and 108a can be different laboratory sites, with the data acquisition modules transmitting captured data from each laboratory site to a plurality of remotely located participants at remote workstations 106 and 106a, via the Internet, for real-time analysis. Experimental data can also be transmitted to Internet storage area 136 for later analysis. According to one embodiment, the local workstations transmit the data. Alternatively, data acquisition modules 108 can include direct Internet access for transmitting information.

Figure 2:
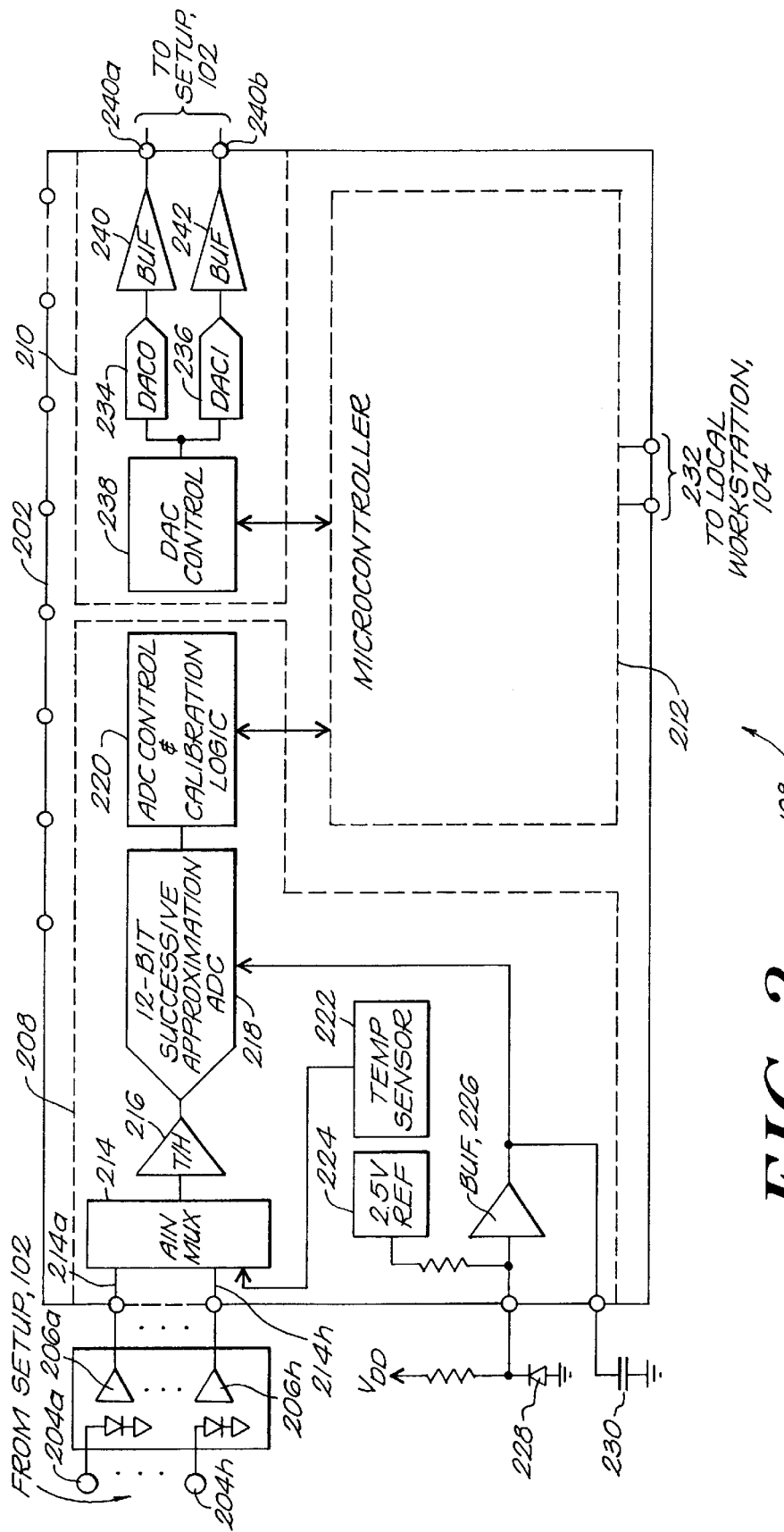
FIG. 2 is a functional block diagram of the data acquisition module of FIG. 1.

FIG. 2 shows a functional block diagram of an illustrative embodiment of the data acquisition electronics module 112 of FIG. 1. The data acquisition module 108 includes optical isolation circuitry 200 and data acquisition and control circuitry 202. Sensor signals 116 of FIG. 1 couple from laboratory setup 102 to inputs 204a–204h of optical isolation circuitry 200. The circuitry 200 includes eight optically isolated amplifiers 206a–206h for electrically isolating and amplifying sensor signals 116 applied to inputs 204a–204h, respectively. Signals 116 can be any analog output signals that are indicative of data from laboratory setup 102. According to a preferred embodiment, signals 116 are biological signals such as, EEG, ECG, EMG, Action Potentials, and the like. Amplifiers 204a–204h identify the type of sensor signal (i.e. voltage range and frequency bandwidth) and automatically adjust gain and bandwidth to appropriate levels.

Inputs 204a–204h can be configured in a variety of manners. According to one embodiment, inputs 204a–204h are configured as three single ended inputs and one differential input. According to another embodiment, they are configured as eight single ended inputs. In a further embodiment, inputs 204a–204h are configured as two biopotential and two differential inputs.

According to an illustrative embodiment, the data acquisition and control circuitry 202 includes an analog-to-digital converter (ADC) 208, digital to analog converter (DAC) 210, and microcontroller 212. ADC 208 includes an 8-input multiplexer 214, buffer 216, 12-bit successive approximation ADC 218, control and calibration logic 220, temperature sensor 222, internal voltage reference 224, buffer 226, an input for an external voltage reference 228 and an input for an external reference capacitor 230. The outputs from optically isolated amplifiers 206a–206h couple to the inputs 214a–214h of analog multiplexer 214. The multiplexer 214 sequentially selects between inputs 214a–214h to be applied to buffer 216. Buffer 216 passes the output from multiplexer 214 to 12-bit successive ADC 218. Buffer 226 couples the sum of internal voltage reference 224 and external voltage reference 228 to ADC 218. External reference capacitor 230 filters the output of buffer 226. Under the control of logic circuits 220, ADC 218 converts the selected input 214a–214h to a digital representation. The microcontroller 212 transmits the digital representation of the experimental data to local workstation 104 by way of serial communication interface 232 and communication line 120. As described above, local workstation 104 subsequently transmits the digital representation of the experimental data to Internet web site 110 for analysis. According to a preferred embodiment, the microcontroller 212 is an ADμC812 integrated circuit, available from Analog Devices, Inc.

The DAC 210 includes DACs 234 and 236 under the control of DAC controller 238, which itself is controlled by microcontroller 212. Buffers 240 and 242 condition the outputs from DACs 234 and 236, respectively. The outputs from buffers 240 and 242 couple back to setup 102 by way of control lines 116. Buffers 240 and 242 can be configured to provide various control signals including any combination of high- or low-voltage bio-stimulator outputs. The voltage level of the outputs from buffers 240 and 242 can be varied by controller 212, in response to a communication from local workstation 104 or in response to a parameter alteration request initiated by a person at a remotely located workstation 106. By way of example, refractory periods in frog sciatic nerves can be determined by altering the period between to successive electrical stimuli delivered locally to the nerve, and commanded remotely.

According to an alternative embodiment, various printed circuit boards containing integrated circuits for performing data acquisition functions of the type described above can be substituted for data acquisition module 108. By way of example, data acquisition printed circuit cards, available from National Instruments, Inc. of Austin, Tex. can be substituted for the above described data acquisition module 108. Regardless of the particular data acquisition circuitry employed, it preferably provides at least eight single-ended analog inputs, such as inputs 204a–204h, and two analog outputs, such as 240a and 240b.

Figure 3:
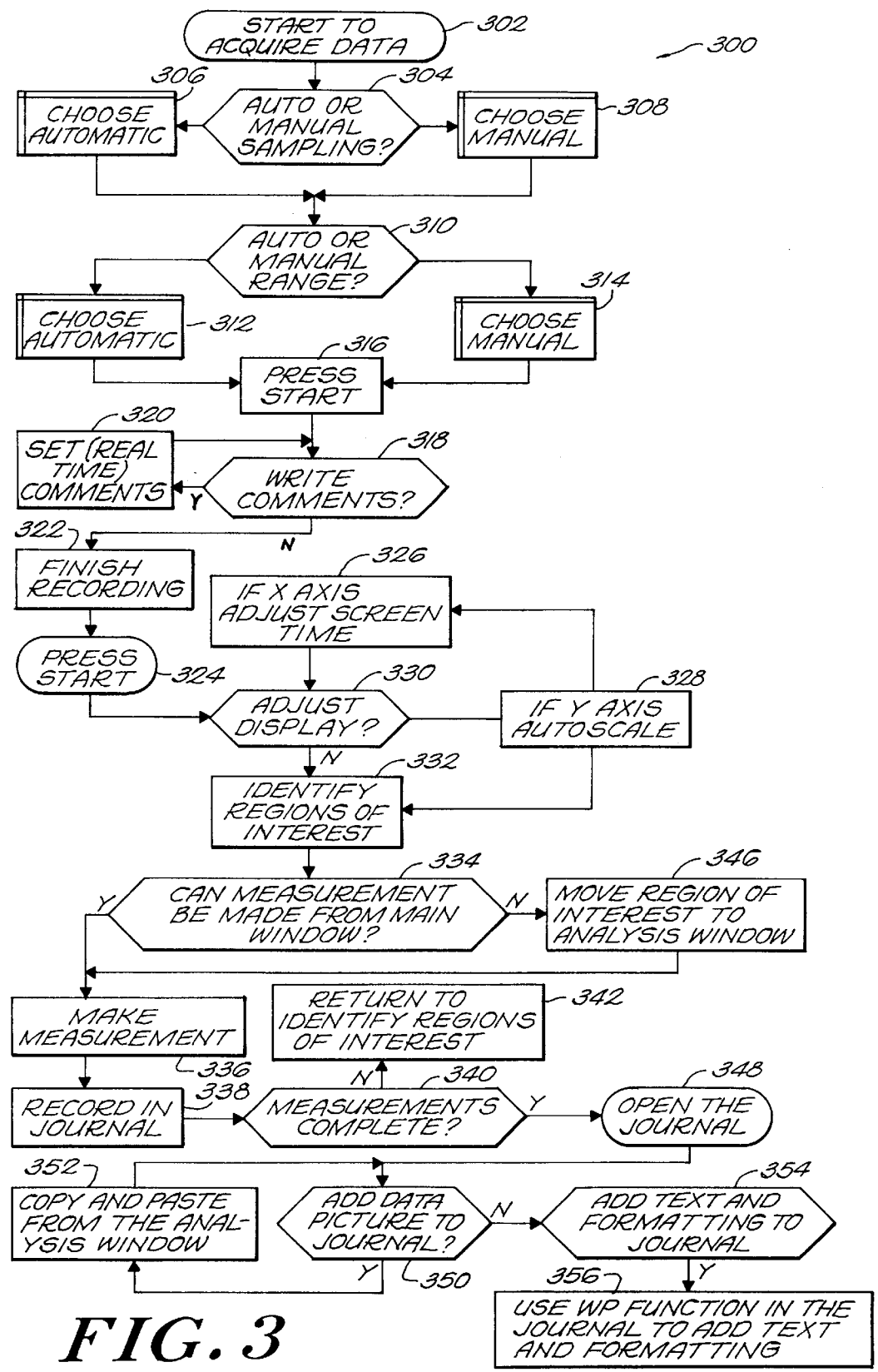
FIG. 3 is a flow chart illustrating operation of software for controlling a data acquisition module of the type depicted in FIG. 2 and for analyzing experimental data.

FIG. 3 is a flowchart 300 illustrating operation of a preferred embodiment of the data acquisition control software 114. The software 114 controls the data acquisition module 108 and provides tools for analyzing experimental data. Flowchart 300 is also descriptive of embodiments wherein the software 114 interfaces with other data acquisition circuitry, such as that available from National Instruments, Inc. The control software 114 is interactive in nature and provides features related to controlling data acquisition module 108, along with features for processing experimental data received from data acquisition module 108. Preferably, software 114 is resident in electronic, magnetic or optical memory at local workstation 104. As discussed in more detail below, the portion of software 114 providing features for processing experimental data is also resident as an application program 134 at Internet web site 110. In this way, locally and remotely situated participants can independently analyze data from module 108.

As shown at 302, on power up the control software 114 signals circuitry 112 to begins the process of acquiring data. As shown at 304, control software 114 signals circuitry 112 to query an operator as to whether control software 114 is to select the sampling rate automatically 306 or whether the operator desires to set the sampling rate manually 308. The sampling rate determines the required minimum time duration for an experimental event that the data acquisition module 108 can capture. By way of example, a human cardiac cycle lasts approximately 0.8 seconds and a particular event takes place in approximately 0.05 seconds. Consequently, to capture cardiac events a sampling rate of at least 100 samples/sec must be selected. In contrast, monitoring environmental temperature requires a sampling rate of approximately 1 sample/second. All manual selections can be made by way of local workstation 104 or remotely from workstation 106, shown in FIG. 1. Amplifiers 206a–206h detect the incoming data signals and are software configured for automatic bandwidth adjustment in response to an operator selecting the automatic option 306. In response to a manually selected sampling rate selection, software configures the amplifiers 206a–206h to have the selected bandwidth.

Once a sampling rate is selected, the control software 114 signals data acquisition module 108 to query an operator 310 as to whether the control software 114 is to select the data signal amplitude range automatically 312 or whether the operator desires to set the amplitude range manually 314. As in the case of the sampling rate, observation of different types of experimental data requires different data signal amplitude ranges. In response to the automatic/manual selection, software configures the amplifiers 206a–206h to have an appropriate gain to accommodate either the manually or automatically selected data signal amplitude range.

As shown at 316, subsequent to bandwidth and amplitude scaling being selected, the local operator signals software 114 to prompt the data acquisition circuitry 112 to begin collecting data. As the data is collected, the data acquisition module transmits the experimental data over the Internet to remote workstations 106 and to Internet web site 110. Additionally, the software 114 stores and displays the received data graphically at local workstation 104. Software 114 detects the sampling rate and amplitude range and automatically adjusts the scaling of the graphically displayed data. As shown at 318, as data is stored, the operator at local workstation 104 can annotate the data. Similarly, using application programs 134, remotely located participants can independently annotate their own copy of the experimental data. As indicated at 320, annotations can be made in real-time or while performing later analysis, and can take a variety of forms, such as notes regarding experimental conditions present during particular observation or anchor points so that bits of data of interest can be located at a later time. Once the operator has finished entering annotations and the data acquisition module 108 has finished recording data 322, the local operator can manually signal 324 the data acquisition module 108 to stop acquiring data.

Subsequent to recording the experimental data, the local operator and the remote participants can analyze the experimental data. According to the illustrated embodiment, analysis begins with adjusting the time axis scaling 326 and the amplitude axis scaling 328 of the displayed data. As indicated at 330 and 332, once the display scaling has been adjusted for ease of viewing, cursors can be positioned to identify regions of interest. Next, as shown at 334, the participants determine if a measurement of an experimental event of interest can be performed from the display window. If so, the desired measurement is performed 336 and entered in a computer-based journal 338. Measurements can include such calculations as determining a mean, a minimum, a maximum, an integral, a derivative or a Fast Fourier Transform. As indicated at 340 and 342, if a participant wishes to perform additional measurements, the participant returns to step 332 to identify additional regions of interest.

As indicated at 346, if the data is too compressed for a measurement is to be performed from the display window, the participant can move the data to an "Analysis" window. The "Analysis" window enables a participant to "zoom" in on or expand areas of interest, thus making it easier to perform the desired measurements. Once the experimental data is expanded, the participant can move on to block 336 to perform the measurement and proceed as depicted in FIG. 3 and discussed above.

As indicated at 348, software 114 includes comprehensive journal features. By way of example and as shown at 350, once all of the desired measurements have been completed, a participant can copy and paste graphical representations of the experimental data into the computer-based journal. As shown at 352, a participant can also copy and paste from the "Analysis" window into the journal. Also, as indicated at 354 and 356, a participant can add, edit and format text in the journal using included word processing functions. Thus, software 114 provides a comprehensive tool for recording and analyzing experimental data received from data acquisition module 108.

The user interface to the software 114 is Windows(g-based. As such, the user interface includes a plurality of menus, including "File," "Edit," "View," "Windows" and "Settings" menus. Software 114 supports the elements of a standard "File" menu. By way of example, "New" opens a new file. According to a preferred embodiment, only one data acquisition window can be open at a time. "Open" opens a previously recorded file. "Close" closes the currently open file. "Save" saves data to the currently open file. "Save as" saves data to a new file. "Print setup" controls the characteristics of printing a document. "Print" prints the forward window. "Exit" quits the program. In addition to standard menus, the present invention includes an "Export Analysis window" menu for enabling a participant to export the data viewable in the "Analysis" window as a text or a picture file. The data can be exported as either a "jpeg" or a "pict" file.

The "Edit" menu supports a plurality of editing functions. "Cut" cuts the forward window. "Copy" copies the forward window. "Copy Special" copies the forward window as text. "Paste" pastes the clipboard to the open window. "Preferences" provides access to a multi-page setup dialog, discussed in further detail below.

The "View" menu provides "Toolbar," "Statusbar," and "Reset comments" functions. "Toolbar" controls whether the tool bar is hidden or displayed. "Statusbar" controls whether the statusbar is hidden or displayed. "Reset comments" moves all of the recorded comments to a comments line.

The "Windows" menu provides "Chart," "Analysis," "Journal," and "Marks" functions. "Chart" brings the "Main Chart" window to the foreground. "Analysis" brings the "Analysis" window to the foreground. "Marks" brings the marks list to the foreground.

The "Settings" menu contains the names of experimental settings defined by the user. To load these settings the user selects a setting from the menu. Two fixed items; one to add new settings and one to delete unused settings are also present.

Software 114 also provides a Windows®-based "Tool Bar." The "Tool Bar" provides shortcuts to various menu and screen button items. They are as follows.

"New" opens a new file. "Open" opens an existing file. "Save" saves an existing file. "Cut" cuts the forward window. "Copy" copies the forward window. "Paste" pastes the clipboard to the open window. "Preferences" calls the multi-page setup dialog. "Chart" brings the "Main Chart" window to the foreground. "Analysis" brings the "Analysis" window to the foreground. "Journal" brings the "Journal" to the foreground. "Marks" brings the "Marks" list to the foreground. "Big Mountain" halves display screen time scale. "Little mountain" doubles display screen time scale. "Single Line" places a first cursor in the middle of the display screen. "Double line" places first and second cursors on the display screen.

Figure 4:
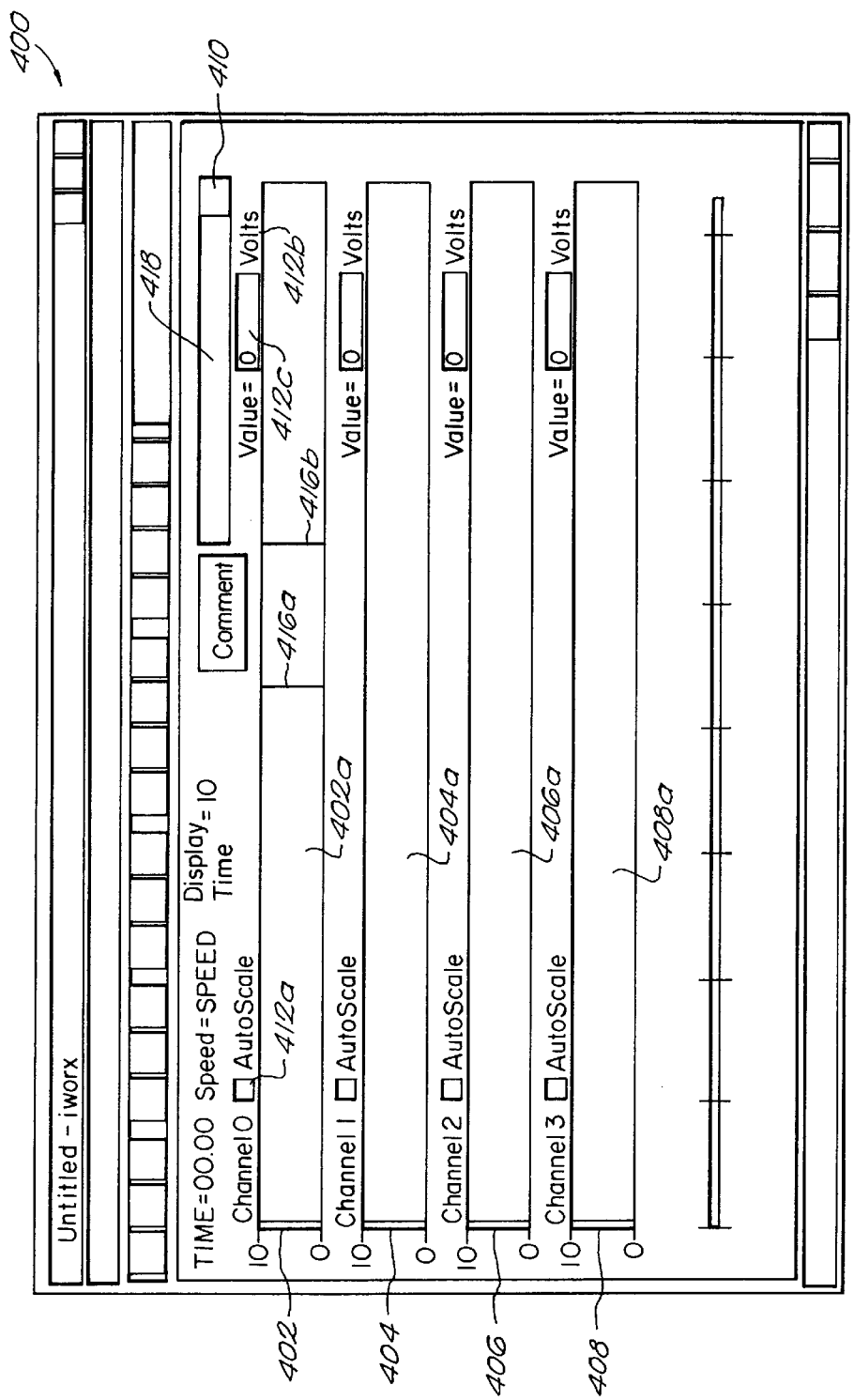
FIG. 4 depicts a "Main Chart" window according to an illustrated
Figure 5:
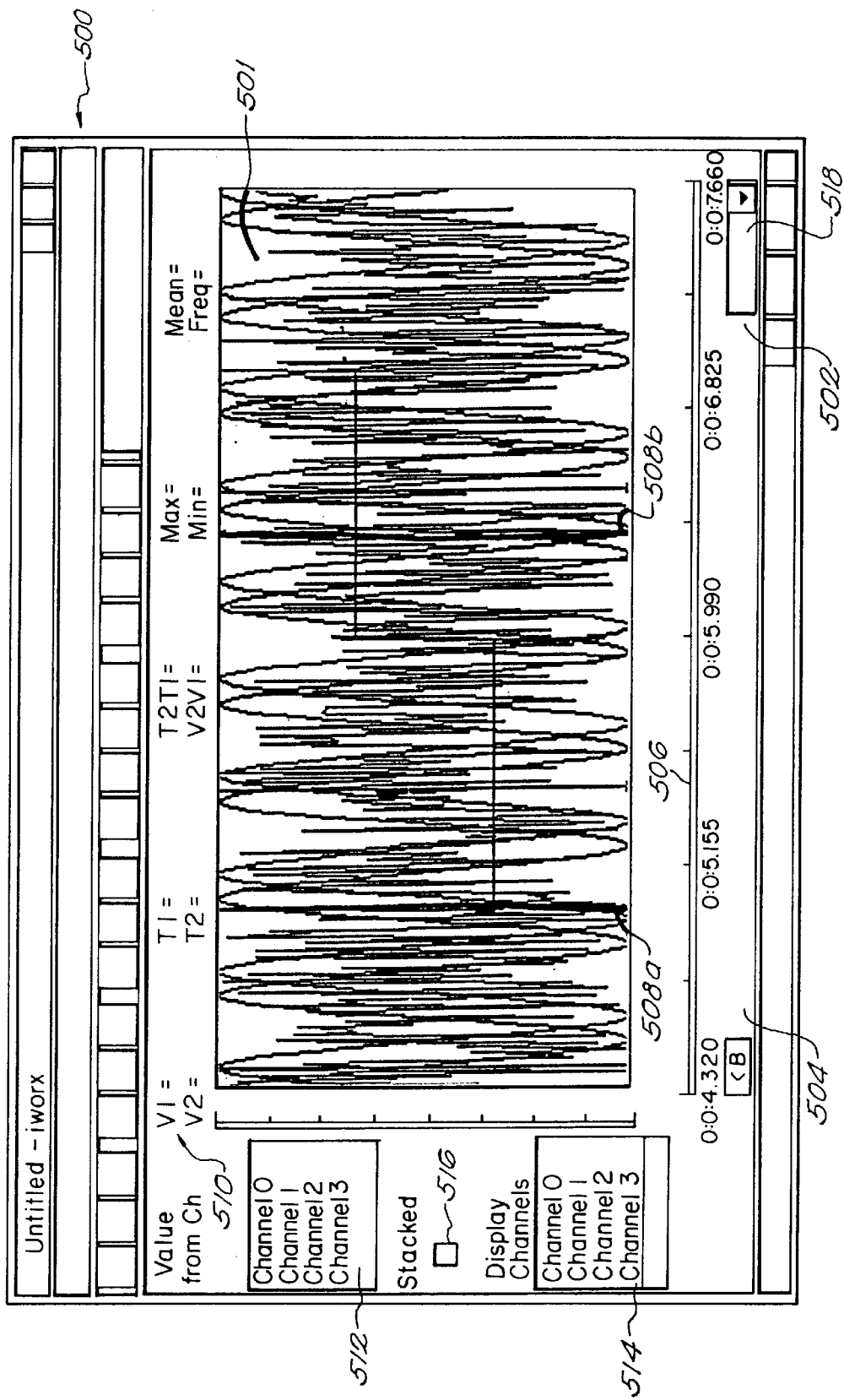
FIG. 5 depicts an "Analysis" window according to an illustrative embodiment of the invention.
Figure 6:
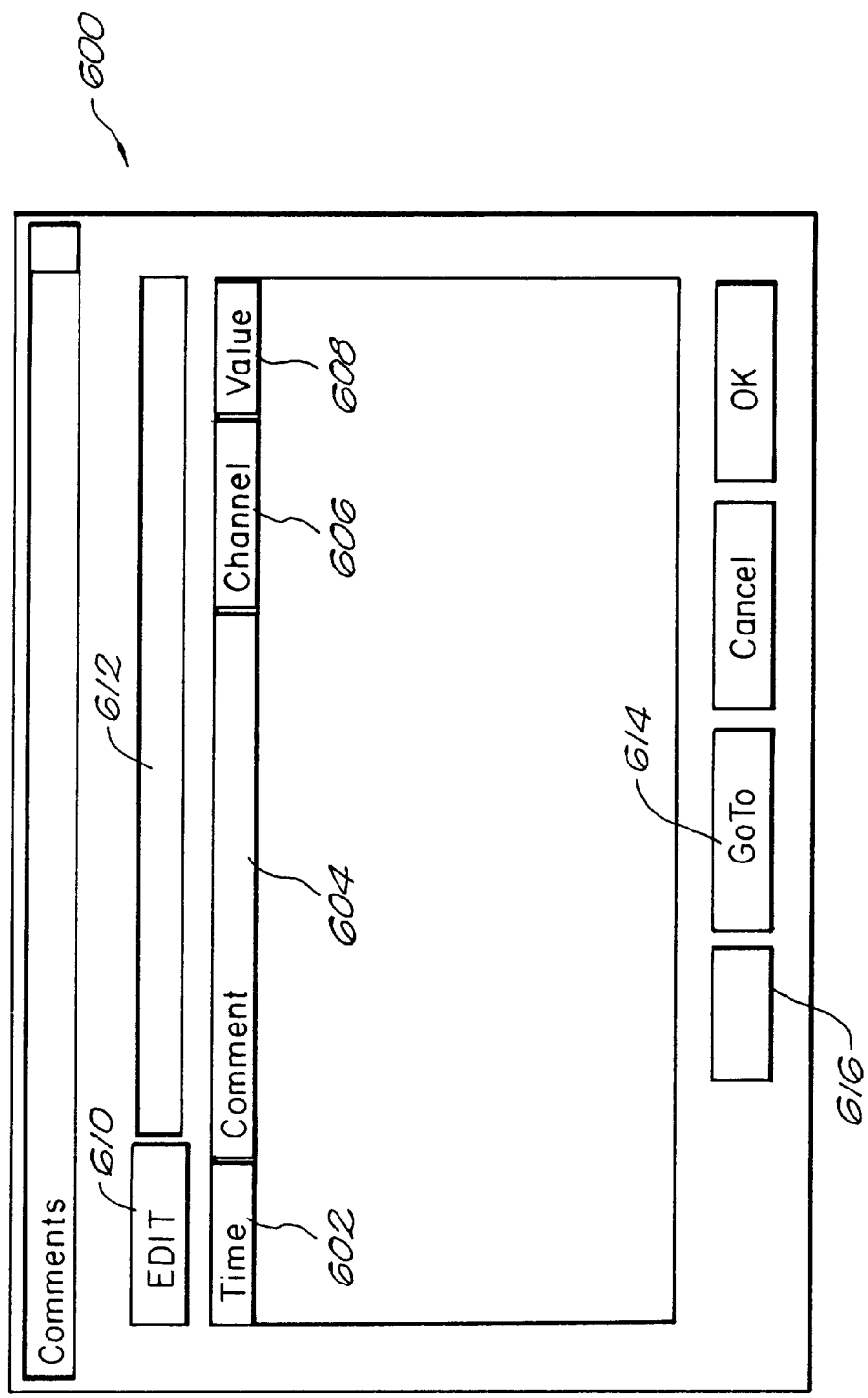
FIG. 6 depicts a "Marks" window according to an illustrative embodiment of the invention.
Figure 7:
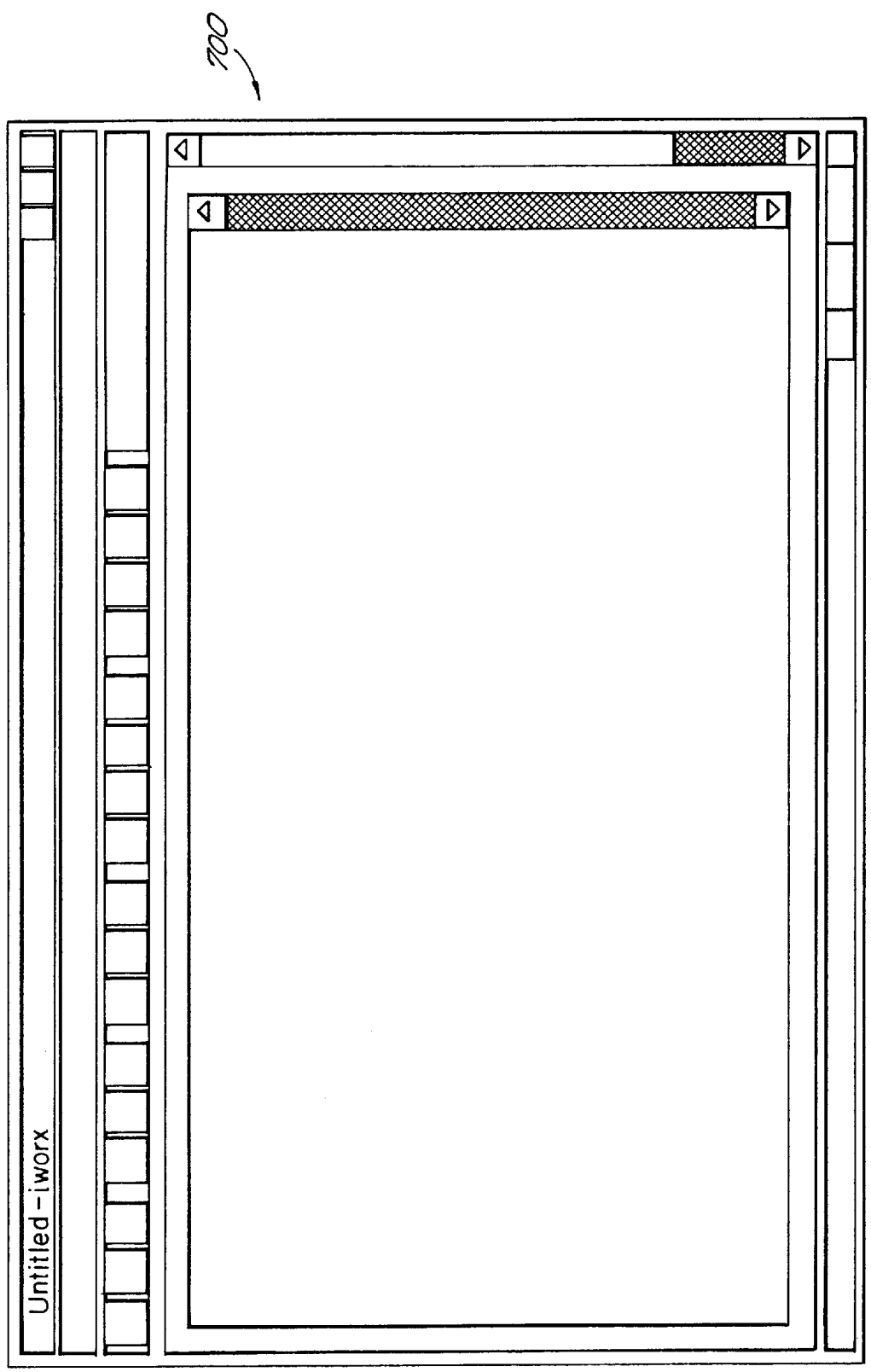
FIG. 7 depicts a "Journal" window according to an illustrative embodiment of the invention.

Additionally, software 114 provides Windows®-based "Screens" and "Dialogs." The Windows®-based screens include the "Main Chart" window shown in FIG. 4, the "Analysis" window shown in FIG. 5, the "Marks" window shown in FIG. 6, the "Journal" window shown in FIG. 7 and the "Preferences" window shown in FIGS. 8a–8d.

The "Main Chart" window 400 of FIG. 4 provides a real-time display of scrolling data 402–408. It can, display up to 16 channels of scrolling data (4 channels are shown). Recording of data is accomplished by actuating the start/stop button 410 on the upper right corner of the window. Each channel area 402a, 404a, 406a and 408a in the "Main Chart" window is re-sizeable and includes a header, referred to as a "channelbar" that contains the controls for the scaling 412a the display units 412b, and a "value display area" 412b for displaying either cursor selected data, or real-time values for data being received on that channel.

One of the tools available in the "Main Chart" window is the cursors 414a and 414b. One 414a or two 414b cursors can be employed. In single cursor mode, the value of the data at the cursor is displayed in the "value display area" 412b on the right of the "channelbar." In double cursor mode, several functions are enabled. The program 114 defines "the selection" as the area between the cursors 416a and 416b. The selection is used to Print, Save, or Export selected data. The selection also defines the region of data to be displayed. In the "Main Chart" Window 400, the difference in time and voltage between the data points identified at a first cursor 416a and a second cursor 416b (C1 & C2) on each channel 402–408 are displayed in the "value display area 412c."

The cursors also provide for units conversion. More specifically, when two cursors 416a and 416b are positioned, the user can click on the "units" button in the "channel bar." This calls a dialog that contains the voltage values at the two cursors 416a and 416b, and queries the user to specify the value, in real units, for each of the two voltage values. Accepting the dialog applies the units function. Units conversion to real units can be used when the relation of voltage to the measured parameter is linear. This function can be turned off at any time. By way of example, a conversion can be applied to the voltage so that real units such as millimeters of mercury, degrees centigrade or Fahrenheit, pH and the like can be displayed.

The "Analysis" window 500 of FIG. 5 provides the user interface for performing the analysis functions described with respect to FIG. 3. It can be called either from the Windows® menu or the Toolbar shortcut. To open the "Analysis" window 500, the "Main Chart" window 400 is preferably in 2-cursor mode; with the cursors 416a and 416b specifying selected data. The "Analysis" window 500 expands the selected data to the full dimension of the "Analysis" window screen 501. Once opened, it is possible to zoom in and zoom out on data in the "Analysis" window 500. It is also possible to scroll right 502 or left 504 on the time axis 506. The "Analysis" window 500 includes a set of cursors 508a and 508b that are in the same fashion as those of the "Main Chart" window 400. If only one cursor 508a is moved into the data, then the "Analysis" window 500 reports the (X,Y) coordinates for the data point identified at the cursor 508a. If two cursors 508a and 508b are used, software 114 performs a series of calculations. Those calculations are displayed on the "channelbar 510." The cursors 508a and 508b can also be used to re-zoom within the "Analysis" window 500.

To the left of the display area 501 in the "Analysis" window 500, there are three "list" boxes. The first "list" box (not shown) displays a scrolling list of functions that will be executed on the data between the cursors, and displayed in the "channelbar." A participant can select up to eight functions to be computed simultaneously. It is these values that are sent to the Journal when the "send to journal" button is clicked. Functions available include but are not limited to: C1, C2, T1, T2, T1–T2, C1–C2, Average, Maximum, Minimum, Minimum-Maximum, Average Maximum, Average Minimum, Rate, Count and Slope. The second list box 512 displays a scrolling list of available data channels. A user can select an available channel to determine which channel data will be operated on by the functions selected above. The third list box 514 also displays a scrolling list of available channels. A user can select up to eight data channels to be displayed in the "Analysis" window 500. Multiple channels can be overlaid or stacked. At the lower right portion of the window is a pop-up menu 518 that determines an operational mode for the "Analysis" window 500. Modes include, but are not limited to: Chart/zoom, XY plot, Fast Fourier Transform (FFT) and "Scope." The "Scope" window shown in FIG. 5 provides an oscilloscope-like display of the data i.e. in a waveform in a selected channel. In the same manner as described above with regard to data in the "Analysis" window 500, and as also shown in FIG. 5, the set of cursors 508a and 508b enable a user to zoom in and out on displayed waveforms and to direct software 114 to perform measurements and calculations on data presented in waveform format as shown.

The "Marks" window 600 of FIG. 6 enables a user to view annotations or "Marks" directed to portions of recorded data of particular interest. According to the invention, a "Mark" is a time locked text annotation. For example, a "Mark" can indicate that at a time such as, 4 minutes 35 seconds into the recording, the experimenter injected 20 micrograms of a particular drug, or that the laboratory assistant bumped into the setup and caused a blip in the record. "Marks" are created by typing in the "Comments" area 418 in the "Main Chart" window 400. They are loaded into the record by striking the return or enter key. In reviewing the data, the "Marks" that have been loaded into the "Main Chart" window 400 appear as thin gray lines that start at the top of the first channel 402 and extend vertically downward through the last channel 408. The time at which the mark occurred is displayed in the time field 602. Comments text is displayed in the comments field 604. The channel on which the mark occurred is displayed in the channel field 606. Comments can be edited by clicking on the "EDIT" button 610 and typing edits in field 612. After recording, the user can select a text "Mark" by clicking and holding onto it, dragging it up into the record and positioning it on the data to which it applies. "Marks" positioned in this way will show in the "Analysis" window 500 as well, and will print in a What You See Is What You Get (WYSIWYG) format. "Marks" are also used as data navigation tools in that they are sorted by time and listed in the "Marks" window. By selecting a "Mark" in this window 600 and clicking on the "GOTO" button 614 at the bottom of the window, the screen display in the "Main Chart" window 400 centers the mark and the data surrounding it on the display. In addition to the text comment 604 and the time 602 of the "Mark," the window 600 displays the value 608 of the data on the channel 606 to which the "Mark" pertains at the time the "Mark" was loaded. If the text comment 604 is left in the comments area at the bottom of the "Main Chart" window 400 (as opposed to having it dragged to a specific channel) no values other than time are displayed. Additionally, it is possible to send the data values at selected "Marks" to the Journal by clicking the "STJ" button 616 to the left of the "GO TO" button 614.

The "Journal" window 700 of FIG. 7 provides access to a computer-based journal for reporting experimental findings. Additionally, the "Journal" window 700 provides a word processor capable of receiving pictures or numbers from anywhere in program 114. It also accepts keyboard input. A participant can employ the "Journal" window 700 to enter a paragraph or two about the experimental setup 102. A participant can also include pasted pictures, along with measurement values from the "Analysis" window 400. With the addition of an explanation for the observed data and conclusions regarding the performed analysis, a laboratory report can be created. The participant can then print the journal, e-mail it or save it as either an RTF or HTML file.

The "Preferences" window of FIGS. 8a–8d provides a variety of controls for adjusting software performance to encompass a plurality of applications. These controls are located in the four-page "Preferences" window. The four pages are: the "Sampling" page of FIG. 8a; the "Channel 1–8" page of FIG. 8b; the "Stimulator" page of FIG. 8c; the "Functions" page of FIG. 8d. Each of the four pages is discussed below.

Figure 8A:
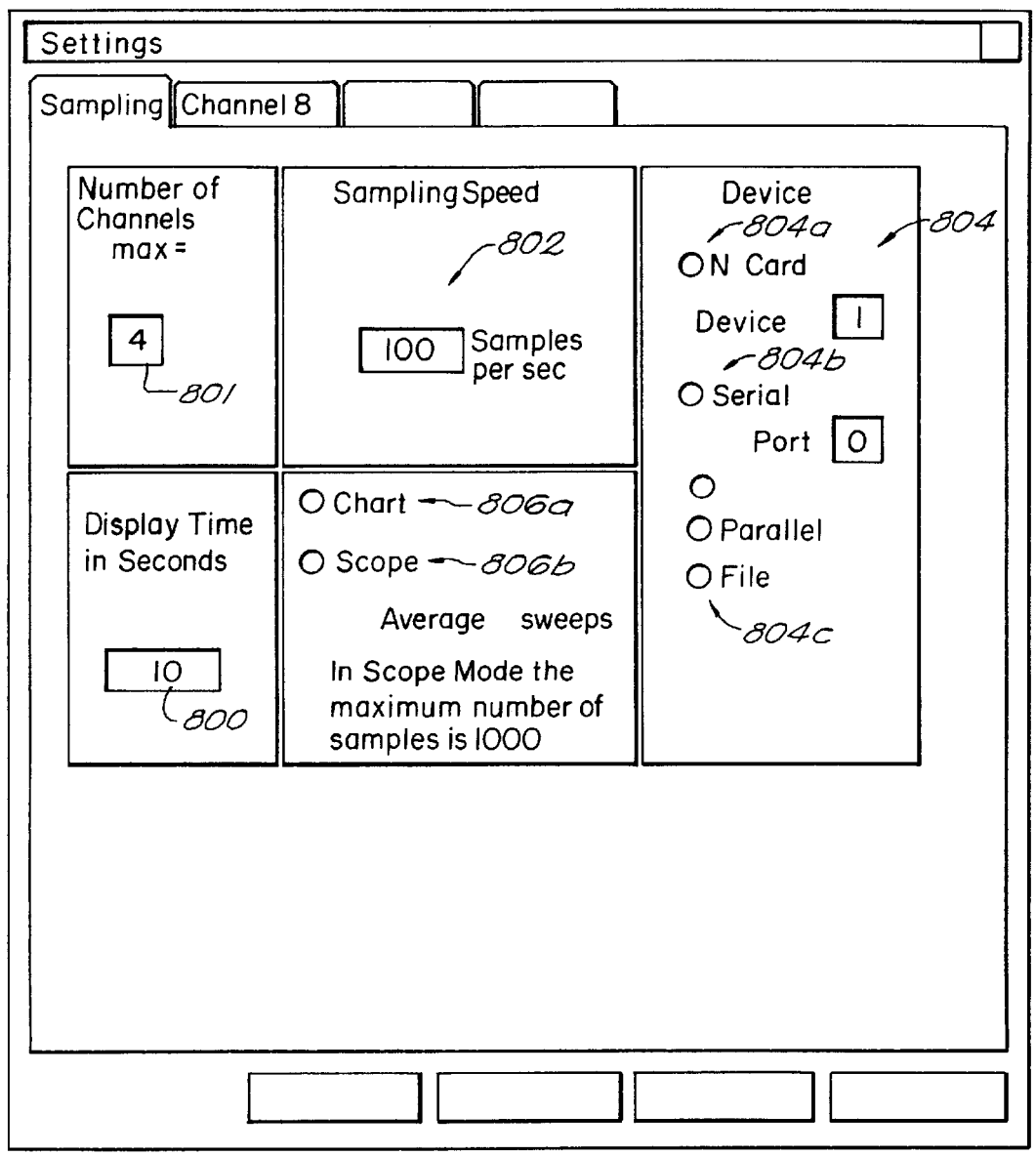
FIGS. 8a–8d depict a "Preferences" window according to an illustrative embodiment of the invention.

The "Sample" page of FIG. 8a enables a participant to specify at 802 whether "auto sample," discussed above with respect to block 304 of FIG. 3, is used; the default dedicated sample speed in the event that "auto sample" is turned off, the default display time 800; and the total number of channels to be displayed (e.g., 4, 8 or 16) 801. The "Sampling" page also enables a participant to select at 804 the source of data. For example, the source can include any National Instruments, Inc. device 804a, any Ethernet device 804b, or a data file 804c. Ether net enables TCP/IP as the communications protocol, this can be used locally or from a distance. The "Sampling" page also enables selection of a "Chart" 806a or "Scope" 806b mode of display.

Figure 8B:
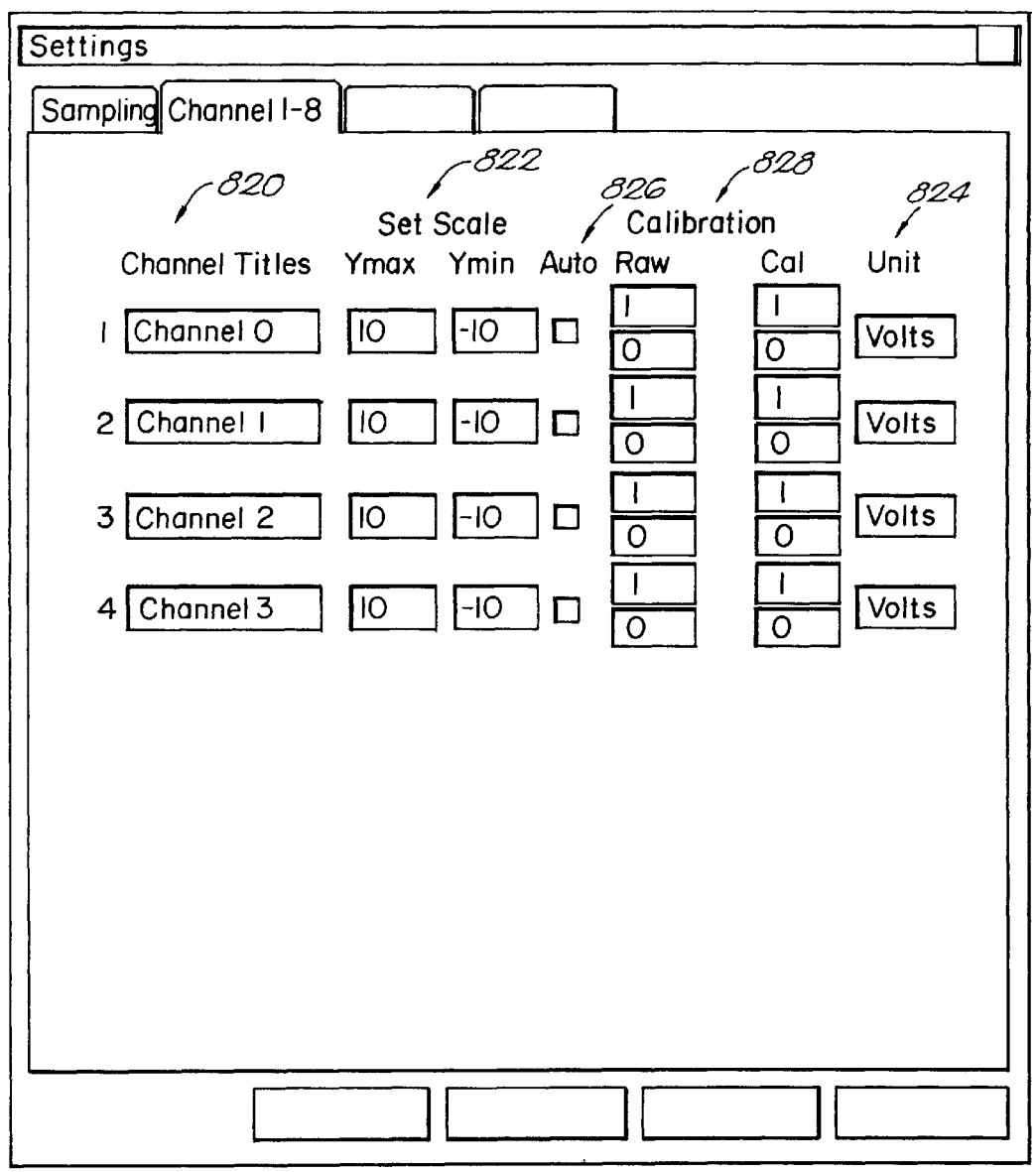

The "Channel 1–8" page of FIG. 8b enables a participant to specify Channel title 820, fixed display scale 822 in the event that auto range is turned off, real units 824, Auto scale on/off 826, and the calibration 828 between raw data and real units.

Figure 8C:
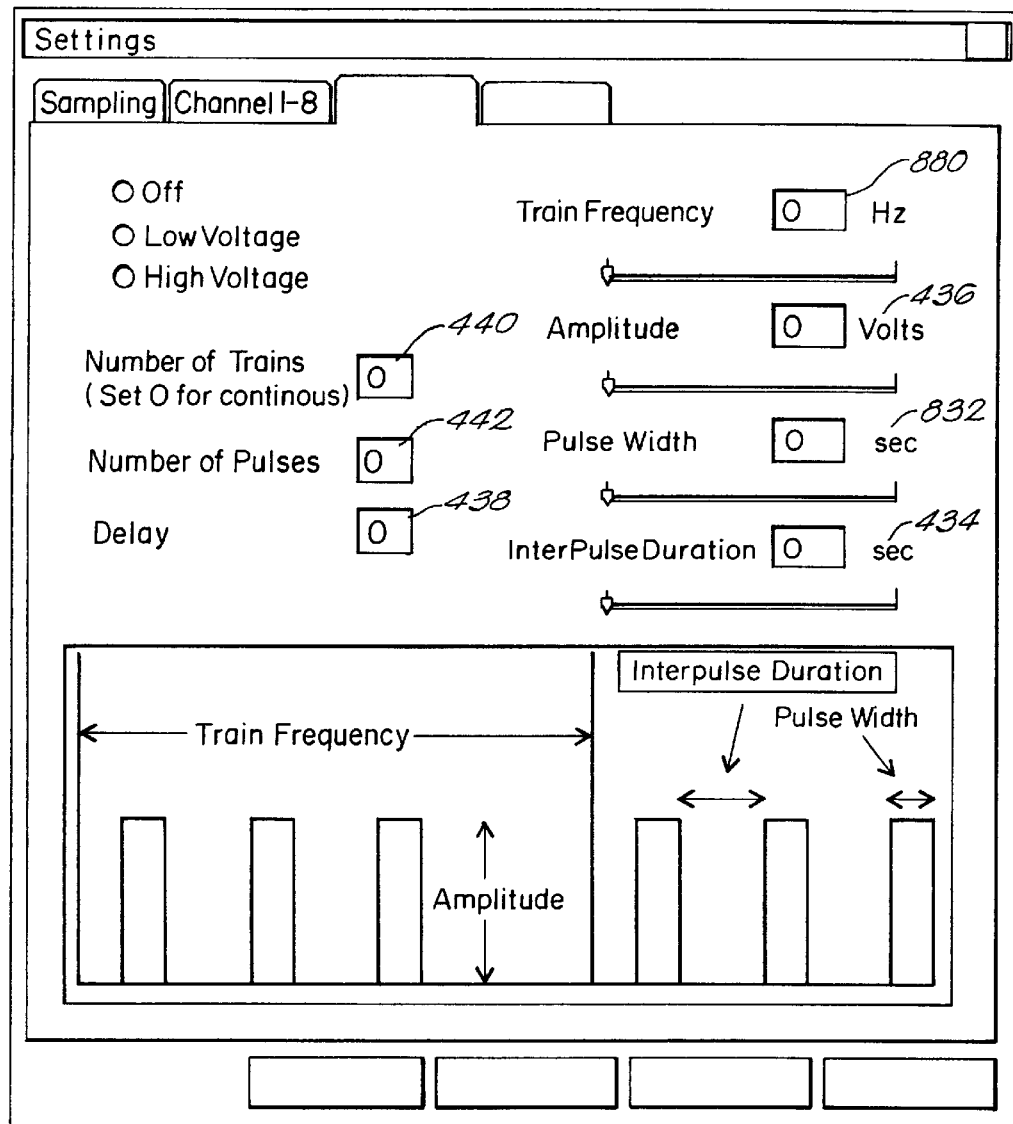

The "Stimulator" page of FIG. 8c enables the user to program the DACs 234 and 236 of FIG. 2. A participant can select from three modes of pulse delivery; single, twin or continuous. A participant can also select the number of pulse trains 440 and the number of pulses 442. Additionally, pulse parameters of train frequency width 832, duration, delay 438, inter-pulse duration 434 and amplitude 436 are also set from the "Stimulator" page.

Figure 8D:
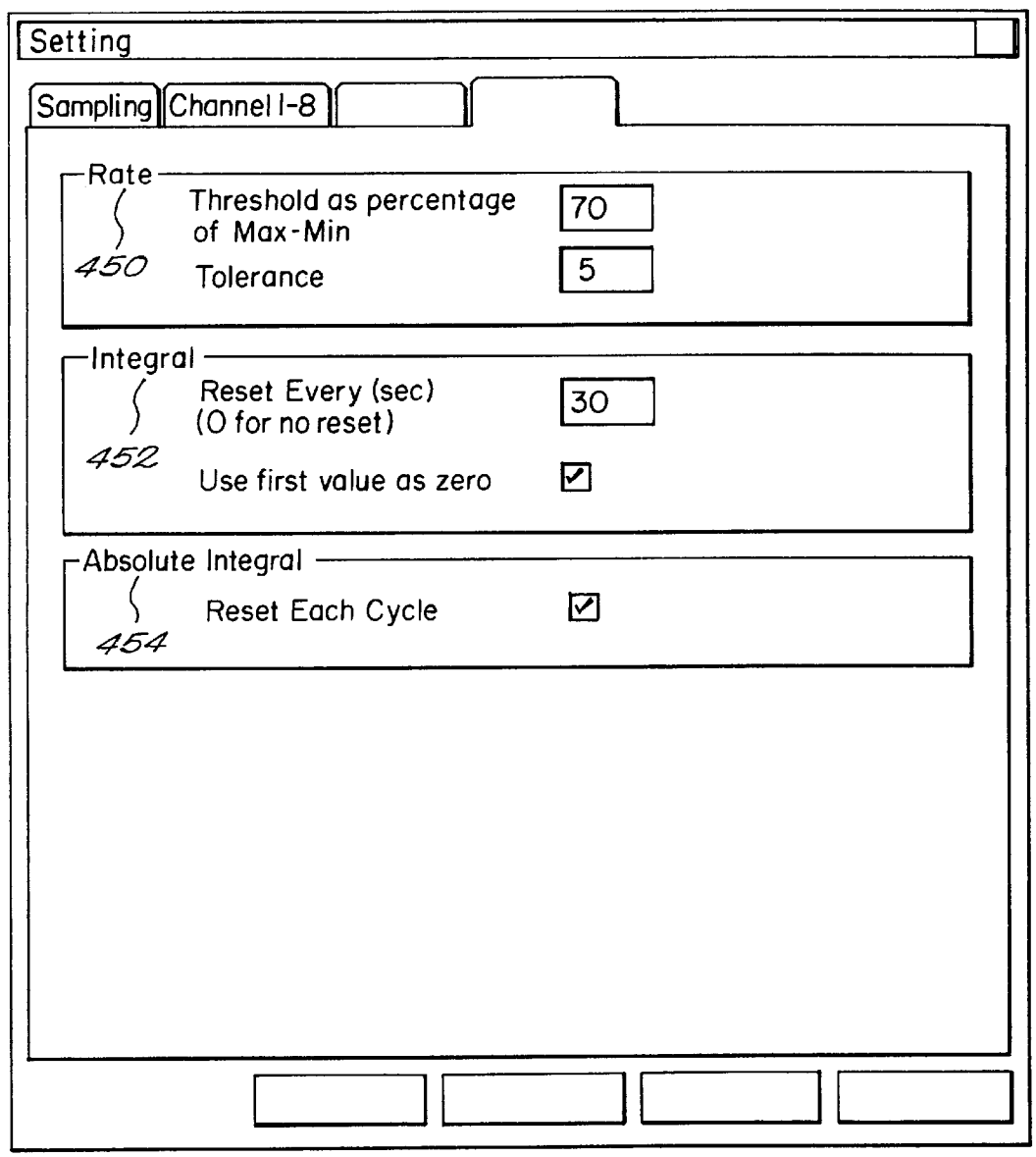

The "Functions" page of FIG. 8d provides a participant with the ability to adjust the parameters used to determine a rate 450, integral 452 and an ABS Integral on-line.

As discussed with respect to FIG. 1, Internet web cite 110 includes application programs 134 and coursework library 132. The application programs 134 include programs for enabling remotely located students to participate in laboratory experiments and to analyze experimental data in real-time with respect to when an experiment is performed. Those application programs are described above with respect to FIG. 3 and the related Windows®-based user interface of FIGS. 4–8.

Application programs 134 also include a plurality of Internet web-based tools for enabling an instructor to select course materials and related experiments from database 132 and for customizing the presentation of the selected course materials. Database 132 includes materials related to such topics as human physiology, animal physiology, psychophysiology, neurobiology and botany. According to a preferred embodiment of the invention, the materials of database 132 are available in ASCII text and HTML. Those skilled in the art will appreciate that the HTML version provides multimedia functionality.

FIG. 9 depicts a flowchart of course builder software 900 that provides the instructor with Internet web-based tools for selecting course materials and for customizing the presentation of those materials. The course builder software 900 also enables an instructor to provide access to some or all of the analytical tools discussed above with respect to FIG. 3 and the related Windows®-based user interface of FIGS. 4–8. Software 900 can reside at Internet web site 110. Alternatively, software 900 can be stored on an optical or magnetic storage disk.

Course builder software 900 directs an instructor through the process of constructing a series of Internet web pages. The first web page is the "Master" page for the course. The instructor, using software 900, can include a number of hyperlink buttons on the Master page for providing students with access to selected course materials, laboratories, lecture notes, tests, communication tools, and data recording, analysis and intervention tools. More specifically, software 900 at 902 prompts the instructor as to create a web page. If the instructor does not wish to create web pages, the program terminates at 904. If the instructor wishes to create web pages, the software 900 progresses to 906 and loads the course builder software 900 into the memory of the instructor's workstation. As mentioned above, the software 900 can be down loaded from internet web site 110 or can be loaded from a magnetic or optical disk. As indicated at 908, the instructor accesses the Master page builder. At 910 the instructor can choose from a variety of Master page layouts. As indicated at 912, the instructor then selects the course components to be included and hyperlink buttons to provide the students with access to the course components. As shown at 914, the instructor can include a graphic image as part of the Master page layout. As indicated at 916, when finished designing the Master page, the instructor can preview the page. If the Master page is satisfactory 918, the instructor can proceed to save the page at 920 as an HTML file.

Following construction of the Master page, the instructor preferably creates pages for each of the hyperlink buttons included in the Master page. By way of example, if the instructor includes a laboratory component, then specific laboratory experiments from the coursework data base 132 can be selected at 922 and 924. Subsequent to selecting particular laboratory experiments, the instructor designs a laboratory experiment launch page at 926. The laboratory experiment launch page typically lists the laboratory experiments and the dates on which they are each to be performed. As discussed in further detail below, if a student clicks on a particular laboratory experiment on the day it is to be performed, the student is included as a remote participant in the experiment. Alternatively, if a student clicks on an experiment subsequent to the date that it has been performed, the student gains access to the data for the particular experiment stored in the Internet-based storage space 136. Regardless of whether the laboratory experiment has been performed, clicking on a particular 10 experiment, provides background and procedural information regarding that experiment. Once a laboratory launch page is created, the instructor can save the launch page at 928 as an HTML file.

At 930 the instructor has the choice of whether to create a lectures component corresponding to a previously created lectures hyperlink button on the Master web page. The lectures component can include self-designed lecture notes or lecture notes from the coursework database 132. At 932 the instructor selects the lecture notes to be included. At 934, the instructor saves the selected lecture notes as an HTML file. At 936 the instructor builds a launch page for the lecture notes. The launch page typically includes a list of topics corresponding to the selected lecture notes, along with the date on which the lecture is to be given. As indicated at 938, the instructor saves the lecture launch page as an HTML file. By clicking on a particular lecture, the student is "launched" into the portion of the coursework database 132 containing the selected lecture notes.

Next, the software 900 prompts the instructor at 940 regarding whether to create a tests database corresponding to a previously created tests hyperlink button on the Master web page. If so, at 942 the instructor chooses which tests from the database 132 to be included. The instructor saves the included tests as an HTML file at 944, creates a launch page at 946 and saves the launch page as an HTML file at 948.

The instructor is prompted at 950 regarding whether to create a communications component for the course. The communications component preferably provides various cyberspace-based communication tools for the students to use throughout the course. By way of example, the instructor can include an email component, a chat group component, a group project component or the like. At 952 the instructor can select from database 132 the particular communication components to be included. At 956 the instructor saves the selected communication components as an HTML file. At 958 the instructor creates a launch page for providing the students with access to the selected communication components. At 960 the instructor saves the launch page as an HTML file.

The software 900 prompts the instructor at 962 regarding whether to provide the students with access to the data viewing, analysis and intervention tools of application programs 134. At 964 the instructor can build a control panel for providing the students with the desired access. By actuating hyperlink buttons on the application program control panel, students gain access to selected ones of application programs 134. At 966, the instructor saves the control panel as an HTML file. At 968 the program 900 assembles the Master web page, along with all of the included course materials, launch panels and control pages.

The Course Builder software flowchart of FIG. 9 is directed to creating a Master course page, along with a variety of sub-pages hyper-linked to the Master page by way of a plurality of hyperlink buttons. The application programs 138 include a variety of Framework Components (FC) for linking together the course materials and analysis tools, in accordance with the instructors Course Builder software selections. The FCs include "Course Page," "Lab Link," "Lecture Link," "Test Link," "Page Link," "Email Link" and "Forum Link."

The "Course Page" FC is a script that creates a Master Course page for a particular academic course. It provides for the incorporation of a variety of hyperlink buttons. The "Course Page" FC essentially provides the HTML glue that enables students to access the areas associated with each of the hyperlink buttons.

The "Lab Link" FC sees to it that the information regarding the laboratory experiments stored in HTML format are accessed when the "LABS" button is clicked on the Master Course page. It in effect "Links" the Master Course page with the course material database 132. It does this by creating a launch page with hot links to the selected course materials.

The "Lecture Link" FC operates in a similar fashion to the "Lab Link" FC. The course material in this case is replaced with the instructors own lecture notes. Clicking on either the "LABS" button or the "LECTURE NOTES" button brings up a launch page that lists the lectures/laboratory experiments by title and date of presentation. The titles are buttons themselves which link a student to the appropriate laboratory experiment or lecture notes.

The "Test Link" FC is similar to "Lab Link" and "Lecture Link" in that it builds a launch page that links up to ten prior exams. The instructor saves exam documents in HTML format from a word processor (as with "Lecture Link" ) and the "Link" feature connects titled hyperlink buttons with the appropriate documents.

The "Page Link" is also similar to the "Lab Link" and "Lecture Link." It allows the instructor to put up a single formatted page. This is useful for special announcements, grade posting, course schedules or any information that can be covered in a single page.

The "Email Link" provides each student with a mailbox within the course. This facility can be used for functions such as distributing grades, distributing corrected lab reports (if they were tendered electronically), exchanging information and asking questions of the instructor or of other students.

The "Forum Link" sets up cyberspace-based discussions. In a sense this provides an electronic class room. Using the "Forum Link," the instructor can divide up the students into manageable groups, assign each group a project and monitor each group as an administrator or moderator. Alternately the entire class can become a single large discussion group.

In addition to the above discussed FCs, the application programs 134 of an illustrative embodiment of the invention also includes several stand alone tools that can be used to create simulation windows or data acquisition windows in web pages or in free standing applets. One such tool is the "Simulation Builder." Another such tool is the "Distance Player."

The "Simulation Builder" plays previously stored data on command. The "Simulation Builder" preferably has an associated "Simulation Link" that generates a launch page for the simulations included in the application programs 134. Once created, simulations can be called from laboratory related pages. By way of example, a pharmacological simulation can include a graphing window with four hyperlink buttons, one for WASH/NO DRUG, one for Ach, one for COLD SALINE and one for KCL. In response to clicking on a particular button the "Simulation Builder" locates the associated data file and plays it in a loop. In response to a different button being actuated, the "Simulator Builder" changes the data being played. In this way, a demonstration can be fabricated from existing files. The resulting demonstration might be included in a custom web page or presented as a free standing teaching tool.

The "Distance Player" transmits experimental data over the Internet to remotely located students. This feature enables remotely located students to view experimental data in real-time with respect to when the experiment is being performed. Alternately, the "Distance Player" can read a data file from the web site 110 and play it out as though it were an experiment happening in-real time. In either case, the student receives a data file, identical to the one recorded by students located at the laboratory site. According to the illustrated embodiment, all of the analytical and report generation facilities discussed above can be applied to the data file. Thus, with synchronous video feeds laboratory experiments can be conducted jointly by participants remotely located with respect to the laboratory and/or each other. Additionally, difficult or challenging experiments, such as a carotid cut down prep or patch clamp experiments, which require high skill levels or expensive equipment, can be performed by one participant (for xample, the instructor in front of the class) while other participants record the data on heir remotely located workstations.

According to a preferred embodiment of the invention, the application programs 134 are coded in JAVA. Thus, the data acquisition programs can be integrated into a larger web page. The course materials can be embedded in the same web page. Therefore, information can be transferred between the different web page components. This transferability is what enables the interactive software components of the data analysis programs to monitor experimental data and prompt a participant to perform various measurements. It also enables the interactive software components to raise questions based on the data content and make suggestions regarding how the data can be better visualized. This feature of the invention effectively provides an automated teaching assistant for the remotely located student.

In operation, a student can select a laboratory experiment in which to participate by way of the above discussed Master page. The student then calls the "Main Chart" window 400 to record experimental data in real-time or to record data played back from Internet-based storage space 136. In the case where the student is recording data in real time, the interactive application programs of application programs 134 monitor the incoming experimental data.

Figure 10:
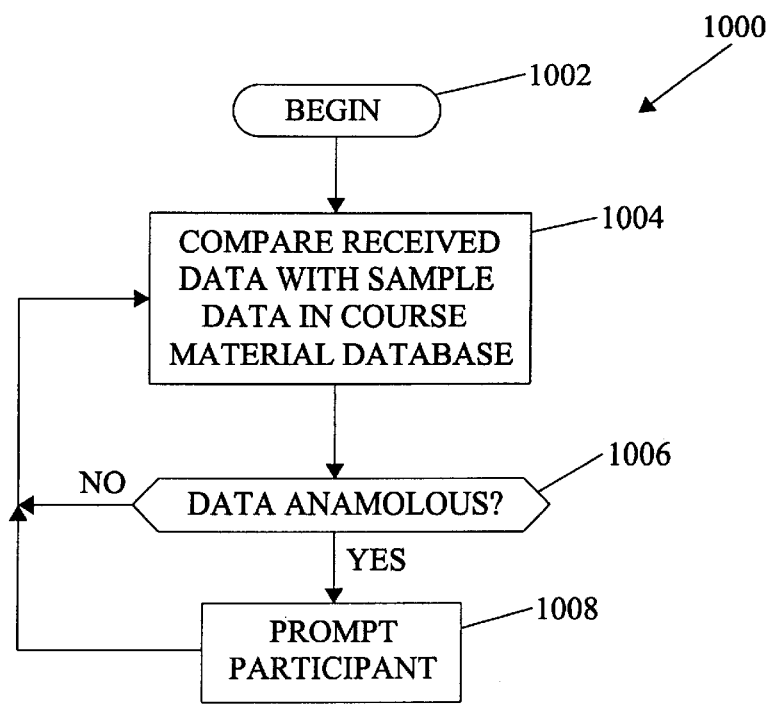
FIG. 10 is a flow chart illustrating operation of interactive features of the invention.

FIG. 10 depicts a flowchart 1000 of an illustrative embodiment of an interactive program according to the invention. Beginning at 1002, program 1000 monitors the data being received from data acquisition module 108. At 1004, program 1000 compares the received experimental data with sample data stored in coursework library 136. As illustrated at 1006, if program 1000 detects anomalous deviations between the sample data and the actual data, it prompts 1008 the participant. The prompt can for example, take the form of a message dialog displayed in the "Main Chart" window 400. In response to the prompt, the participant can signal the data acquisition unit 108 and/or a local participant at local workstation 104 by way of remote workstation 106 and Internet 128, to verify the correctness of experimental setup 102.

Subsequent to recording either real-time or played back data, the student performs selected measurements in accord with the course materials associated with the particular laboratory experiment. According to the illustrated embodiment, the student performs the measurements from the "Analysis" window 500 of FIG. 5. The interactive programs of application programs 134 monitor the measurements being performed.

Figure 11:
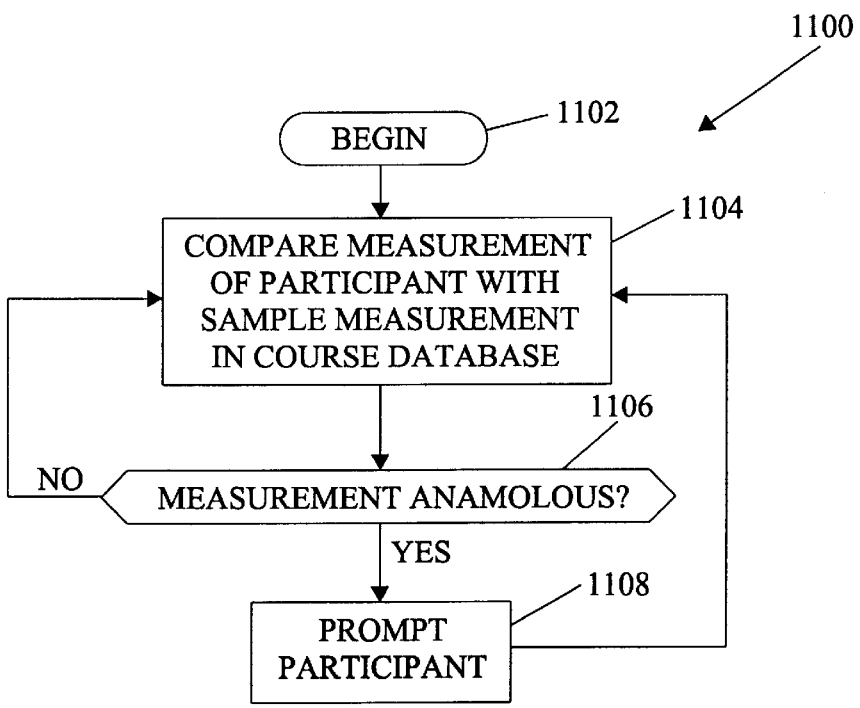
FIG. 11 is a flow chart illustrating operation of additional interactive features of the invention.

FIG. 11 depicts a flowchart 1100 of an illustrative embodiment of an interactive program according to the invention. Beginning at 1102, program 1100 monitors various aspects of the students measurements, such as cursor placement. At 1104, the program 1100 compares the student's measurement with example measurements stored in the course work library 136. As shown at 1106 and 1108, if program 1100 detects anomalies in the performed measurements, it prompts the student. The prompt can for example, take the form of a message dialog displayed in the "Analysis" window 500. In response, the student can redo the measurement. In this way, the interactive features of FIGS. 10 and 11 essentially provide an on-line tutor for remotely located students.

Additionally, those skilled in the art will appreciate, all of the above features of the invention, including the interactive features of FIGS. 10 and 11 are applicable to any persons taking part in an experiment from a remote location. By way of example, a plurality of scientists can employ the features of the present invention to participate jointly in an experiment from remote locations.

It will thus be seen that the invention efficiently attains the objects set forth above, including providing system for analyzing and/or effecting experimental data from a remote location. Since certain changes may be made in the above constructions and the described methods without departing from the scope of the invention, it is intended that all matter contained in the above description or shown in the accompanying drawings be interpreted as illustrative and not in a limiting sense.

Having described the invention, what is claimed as new and protected by Letters Patent is:

1. Apparatus for enabling at least a first person, remotely located with respect to one or more laboratories, to view and analyze data acquired from a selected experiment performed in said one or more laboratories, said apparatus comprising first data acquisition means, located proximate to a first laboratory, for acquiring data associated with a first selected experiment, first data transmission means for transmitting acquired data from said first data acquisition means to a first location remote from the first laboratory, analysis means for enabling a first person to analyze said acquired data received at said first location, and intervention means for enabling a first person to intervene and alter, by way of a data transmission link, an experimental parameter of said first selected experiment, and to observe how said altering effects said acquired data received at said first remote location.

2. Apparatus according to claim 1 further comprising means for enabling a first person to perform said analysis in substantially real-time with respect to when said data acquisition means acquires said data.

3. Apparatus according to claim 1, wherein said analysis means includes mean for determining a plurality of physiological conditions from said acquired data.

4. Apparatus according to claim 1, wherein said data acquisition means includes means for altering an experimental parameter of said first selected experiment in response to a communication from said intervention means.

5. Apparatus according to claim 1 further comprising
storage means for storing said acquired data, and
simulation means, in communication with said storage means and with said intervention means, for simulating how said altering would likely effect said acquired data, and
wherein said intervention means performs said altering through said simulation means.

6. Apparatus according to claim 1 further comprising
interactive means for prompting one or more persons at one or more locations remote from the first laboratory to alter selected ones of said experimental parameters to observe how said altering of said selected parameters effects said acquired data.

7. Apparatus according to claim 1 further comprising
interactive means for acquiring said acquired data, for detecting data anomalies in said acquired data, and for querying a first person as to whether particular aspects of said experiment were performed properly, in response to the detecting of anomalies in said acquired data.

8. Apparatus according to claim 1, wherein said first data transmission means includes means for transmitting said acquired data to a second remote location and said analysis means further includes means for enabling a second person at said second remote location to analyze said acquired data, and said intervention means further includes means for enabling said second person to intervene and alter an experimental parameter, and to observe how said altering effects said acquired data.

9. Apparatus according to claim 8 further comprising means for enabling each of said first and second persons to observe how the altering of experimental parameters by either of said first and second persons effects said acquired data.

10. Apparatus according to claim 1 further comprising
electronically addressable storage means for storing information related to a particular topic, and
selection means connected with said storage means for enabling a person to review a subset of said stored information, and to select therefrom an experiment related to said subset of information, for which acquired data is to be analyzed.

11. Apparatus according to claim 1 further comprising
second data acquisition means, located proximate to a second laboratory at a location different from that of said first laboratory, for acquiring data associated with a second selected experiment, and
second data transmission means for transmitting acquired data from said second data acquisition means to at least first and second persons, wherein
said intervention means includes mean for enabling each of first and second persons to intervene and alter experimental parameters of each of said first and second selected experiments, and to observe how said altering effects said acquired data.

12. Apparatus according to claim 1 further comprising presentation builder means for designing a presentation environment, in communication with said analysis means, and including an interactive visual display, wherein said interactive visual display includes means for enabling a person to select from a plurality of analysis options.

13. Apparatus according to claim 1 further comprising presentation builder means for designing a presentation environment, in communication with said intervention means, and including an interactive visual display, wherein said interactive visual display includes means for enabling a person to select from a plurality of intervention options.

14. Apparatus according to claim 1 further comprising
electronically addressable storage means for storing a library of information relevant to a plurality of topics, wherein said topics have related laboratory experiments, and
presentation builder means for designing a presentation environment, in communication with said storage means, and including an interactive visual display, wherein said interactive visual display includes means for enabling a person to select one of said topics for review.

15. Apparatus according to claim 14, wherein said interactive visual display further includes means for choosing said first selected experiment from said related laboratory experiments.

16. Apparatus according to claim 14, wherein said analysis means, said intervention means and said storage means are adapted for access by a person by way of an Internet browser.

17. Apparatus according to claim 16, wherein said interactive visual display is adapted for accessing said analysis means, said intervention means and said storage means by way of said Internet browser.

18. Apparatus according to claim 1, wherein an experimenter performs said first selected experiment at said first laboratory, and further including conferencing means for enabling a person, at a location remote from said first laboratory, to communicate with said experimenter during performance of said first selected experiment.

19. Apparatus according to claim 1, wherein said analysis means and said intervention means are adapted for access by a person by way of an Internet browser.

20. Apparatus according to claim 1, wherein said analysis means include means for displaying said acquired data as a waveform.

21. Apparatus according to claim 20, further comprising means for performing calculations on data displayed as a waveform.

22. An educational system for students located remotely with respect to each other and with respect to an experimentation site, said system comprising
analyzer means for enabling said remotely located students to collect and analyze data from a selected experiment performed at said experimentation site, and
interactive means for enabling said remotely located students to alter at least one variable associated with said selected experiment, and to observe changes in said data resulting from said alteration.

23. An educational system according to claim 22 further comprising,
transmission means for transmitting said data from said experimentation site to said students, as said data is being collected.

24. An educational system according to claim 22, wherein said interactive means includes prompting means for providing said students with information regarding quality of said experimental data.

25. An educational system according to claim 24, wherein said prompting means is further adapted for providing suggestions for improving said quality of said experimental data, should said quality prove to be deficient.

26. An educational system according to claim 24, wherein said prompting means is further adapted for signaling said students regarding how variables associated with said selected experiment might be altered.

27. Internet-based distance learning apparatus for teaching students remotely located with respect to each other and with respect to a laboratory, said apparatus including
a data acquisition unit for capturing data from experiments conducted in the laboratory,
an Internet site including first storage means for storing course materials pertaining to a selected subject, second storage means for storing data captured by said data acquisition unit, and analysis means for analyzing said data captured by said data acquisition unit and for determining the quality of said data and for signaling suggestions to said students regarding how to improve the quality of said data,
a transmitter for transmitting said captured data to said Internet site and to the students, and
interactive tools in communication with said Internet site and including
(i) means for enabling a student to select course materials to review,
(ii) means for enabling a student to alter at least one experimental parameter, and (iii) means for enabling a student to signal said analysis means to calculate one or more measurements from said data.

28. A method for enabling a person, at a first location remote with respect to a laboratory, to view and analyze data acquired from an experiment performed in said laboratory, said method including acquiring data associated with an experiment from a data acquisition unit in communication with said laboratory, transmitting acquired data from said data acquisition unit to said first location remote from said laboratory, enabling a person to analyze said acquired data received at said first location, and enabling a person to intervene and alter, by way of a data transmission link, an experimental parameter of said experiment, and to observe how said altering effects acquired data received at said first location.

29. A method for teaching students remotely located with respect to each other, said method including capturing data from experiments conducted in a laboratory remote from at least one student, transmitting said captured data to remotely located students, storing course materials pertaining to a selected subject at an Internet site, storing said captured data, comparing said captured data to sample data included in said course materials to identify anomalies in said captured data, signaling students regarding how to alter said experiments to improve said captured data in response to anomalies in said data, altering at least one experimental parameter in response to a command from one of said remotely located students, and calculating one or more measurements from said transmitted data in response to a command from one of said remotely located students.

30. A method for teaching students remotely located with respect to each other, said method including capturing data from an experiment conducted in a laboratory remote from at least one student, storing said captured data, transmitting said captured data to remotely located students, storing course materials pertaining to a selected subject at an Internet site, identifying to students anomalies in said captured data relative to sample data included in the stored course materials, and altering at least one experimental parameter in response to a command from at least one said remotely located student.

31. A method according to claim 30, further including calculating one or more measurements from said transmitted data in response to a command from at least one said remotely located student.

* * * * *